United States Patent
Dobschal et al.

(10) Patent No.: US 10,514,543 B2
(45) Date of Patent: Dec. 24, 2019

(54) IMAGING OPTICAL UNIT AND SMART GLASSES

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 400 days.

(21) Appl. No.: 15/520,066

(22) PCT Filed: Oct. 13, 2015

(86) PCT No.: PCT/EP2015/073671
§ 371 (c)(1),
(2) Date: Apr. 18, 2017

(87) PCT Pub. No.: WO2016/062582
PCT Pub. Date: Apr. 28, 2016

(65) Prior Publication Data
US 2017/0307895 A1    Oct. 26, 2017

(30) Foreign Application Priority Data

Oct. 21, 2014    (DE) .................. 10 2014 115 341

(51) Int. Cl.
*G02B 27/01*       (2006.01)
*G02B 27/00*       (2006.01)
(Continued)

(52) U.S. Cl.
CPC ....... *G02B 27/0172* (2013.01); *G02B 23/105* (2013.01); *G02B 26/0808* (2013.01);
(Continued)

(58) Field of Classification Search
CPC .............. G02B 27/0172; G02B 23/105; G02B 26/0808; G02B 27/0081; G02B 27/01;
(Continued)

(56) References Cited

U.S. PATENT DOCUMENTS

| 6,580,529 B1 | 6/2003 | Amitai et al. |
| 8,233,204 B1 | 7/2012 | Robbins et al. |
| 2010/0208341 A1 | 8/2010 | Dobschal et al. |

FOREIGN PATENT DOCUMENTS

| DE | 102007004444 A1 | 8/2008 |
| DE | 102010041344 A1 | 3/2012 |

(Continued)

OTHER PUBLICATIONS

The International Search Report rendered by the International Searching Authority for PCT/EP2015/073671, dated Dec. 21, 2015, 13 pages.

(Continued)

*Primary Examiner* — Wen Huang
(74) *Attorney, Agent, or Firm* — Skaar Ulbrich Macari, P.A.

(57) ABSTRACT

Disclosed is a coupling device for coupling the imaging beam path between the inner surface and the outer surface of the eyeglass lens; and a decoupling structure-present in the eyeglass lens for decoupling the imaging beam path from the eyeglass lens in the direction of the eye. The coupling device couples the imaging beam path between the inner surface and the outer surface of the eyeglass lens such that the imaging beam path is guided to the decoupling structure via reflections between the inner surface and the outer surface. A beam-splitting structure is present between the display device and the area of the eyeglass lens, in which the first reflections occurs, said beam-splitting structure splitting the imaging beam path extending from the image generator into two partial imaging beam paths, which form the beam paths arriving from different directions on the partial structures of the decoupling structure.

14 Claims, 5 Drawing Sheets

(51) Int. Cl.
   *G02B 23/10* (2006.01)
   *G02B 26/08* (2006.01)
   *G02B 27/32* (2006.01)
(52) U.S. Cl.
   CPC ......... *G02B 27/0081* (2013.01); *G02B 27/01* (2013.01); *G02B 27/32* (2013.01); G02B 2027/0125 (2013.01); G02B 2027/0178 (2013.01)
(58) Field of Classification Search
   CPC ............ G02B 27/32; G02B 2027/0125; G02B 2027/0178
   See application file for complete search history.

(56) References Cited

FOREIGN PATENT DOCUMENTS

| | | |
|---|---|---|
| JP | 2004258332 | 9/2004 |
| JP | 2012247480 A | 12/2012 |

OTHER PUBLICATIONS

Office Action to the corresponding German Patent Application No. 10 2014 115 341.3 rendered by the German Patent and Trademark Office dated Jun. 29, 2015, 4 pages.
International Preliminary Report on Patentability rendered by the International Bureau of WIPO for PCT/EP2015/073671 dated May 4, 2017, 25 pages.
Office Action to the corresponding Japanese Patent Application No. 2017-517295 dated Sep. 2, 2019, 4 pages (including English translation).

IMAGING OPTICAL UNIT AND SMART GLASSES

PRIORITY

This application claims the benefit of German Patent Application No. 102014115341.3, filed on Oct. 21, 2014, which is hereby incorporated herein by reference in its entirety.

FIELD

The present invention relates to an imaging optical unit for depicting a virtual image as well as smart glasses with an imaging optical unit for depicting a virtual image.

BACKGROUND

Smart glasses are a special form of a head-mounted display. A common form of head-mounted display uses screens which are worn in front of the eyes and present the user with computer-generated images or images taken by cameras. Such head-mounted displays are frequently bulky and do not allow for a direct perception of the surroundings. Only recently have head-mounted displays been developed that are capable of presenting to the user an image taken with a camera or a computer-generated image without preventing the immediate perception of the surroundings. Such head-mounted displays, hereinafter called smart glasses, allow for the use of this technology in everyday life.

Smart glasses can be provided in different ways. One type of smart glasses which is characterized particularly by its compactness and esthetic acceptance is based on the principle of wave guidance in the eyeglass lens. Light generated by an image generator is collimated outside of the eyeglass lens and coupled in via the end face of the eyeglass lens, from where it spreads by means of a plurality of total reflection up to the front of the eye. An optical element located there subsequently decouples the light in the direction of the eye pupil. The coupling into the eyeglass lens and the decoupling from the eyeglass lens can be either diffractive, reflective, or refractive.

For diffractive coupling and decoupling, diffraction gratings with almost identical line count are used as coupling and decoupling elements, wherein the greatly dispersive effects of the individual gratings are compensated among each other. Decoupling elements based on diffraction gratings are described, e.g. in US 2006/0126181 A1 and in US 2010/0220295 A1. Examples for smart glasses with reflective or refractive coupling and decoupling elements are described in US 2012/0002294 A1.

Smart glasses, in which an imaging beam is guided a number of (total) reflections from a coupling element to a decoupling element, have, regardless of whether diffractive, reflective, or refractive elements are used as coupling and decoupling element, the problem of the so-called "footprint overlap" in common. This problem, which limits the size of the field of view (FOV) as well as the size of the exit pupil of the smart glasses at the location of the eye box, and as a result requires a relatively great eyeglass thickness, shall be explained in the following in more detail using FIGS. 1 and 2.

Figure 1:
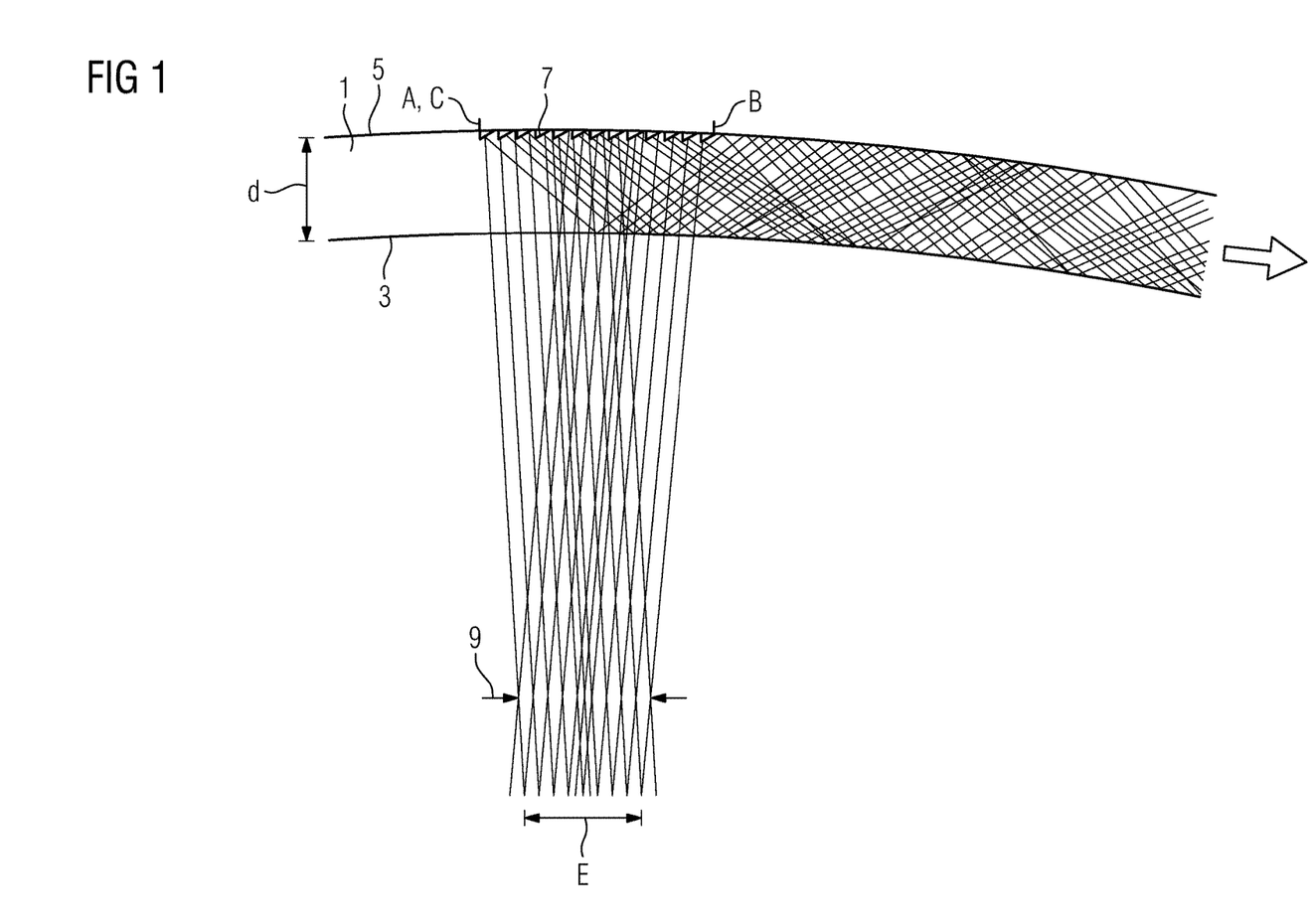
FIG. 1 shows a section of the imaging beam path in smart glasses according to prior art with a small field-of-view angle.

The eye box is the three-dimensional area of the light tube in the imaging beam path, in which the eye pupil can move without resulting in a vignetting of the image. Since in smart glasses, the distance of the eye relative to the smart glasses is essentially constant, the eye box can be reduced to a two-dimensional eye box which only takes into account the rotational movement of the eye. In such case, the eye box corresponds essentially to the exit pupil of the smart glasses at the location of the entrance pupil of the eye. As a rule, the latter is constituted by the pupil of the eye. Even though smart glasses are a system, in which an imaging beam path runs from the image generator to the exit pupil of the smart glasses, it is useful for understanding the "footprint overlap" to look at the beam path from the reverse direction, i.e. from the exit pupil to the image generator. Therefore, in the following explanations, a light tube proceeding from the exit pupil of the smart glasses shall be examined, wherein the boundaries of the light tube are determined by the field-of-view angle of the beams expanding from each point of the eye box in the direction of the eyeglass lens. After diffraction on the inner surface 3 of the eyeglass lens 1, the beams impinge in the light tube on the outer surface 5 of the eyeglass lens 1. In it, the decoupling structure 7, which extends in horizontal direction from point B to point C, is located. The distance between points B and C is determined by the desired expansion of the light tube which, in turn, depends on the desired size of the eye box 9 and the desired field-of-view angle. Here, the field-of-view angle is primarily the horizontal field-of-view angle which, relative to the visual axis, relates to the angle at which the horizontal boundary points of the image field impinge in the pupil. In this case, the visual axis denotes a straight line between the fovea of the eye (point of sharpest vision of the retina) and the center of the image field. FIG. 1 shows the profile of the light tube at an eye-box diameter E and a thickness d of the eyeglass lens 1 for a relatively small field-of-view angle. All beams of the light tube are deflected or reflected from the decoupling structure 7 in the direction of the inner surface 3 of the eyeglass lens 1 and from there by means of total reflection reflected back to the outer surface 5 of the eyeglass lens 1, from where they are reflected back again under total reflection to the inner surface 3 of the eyeglass lens 1. This back-and-forth reflection occurs until the coupling element is reached, from where the light tube then continues to extend in the direction of the image generator.

Figure 2:
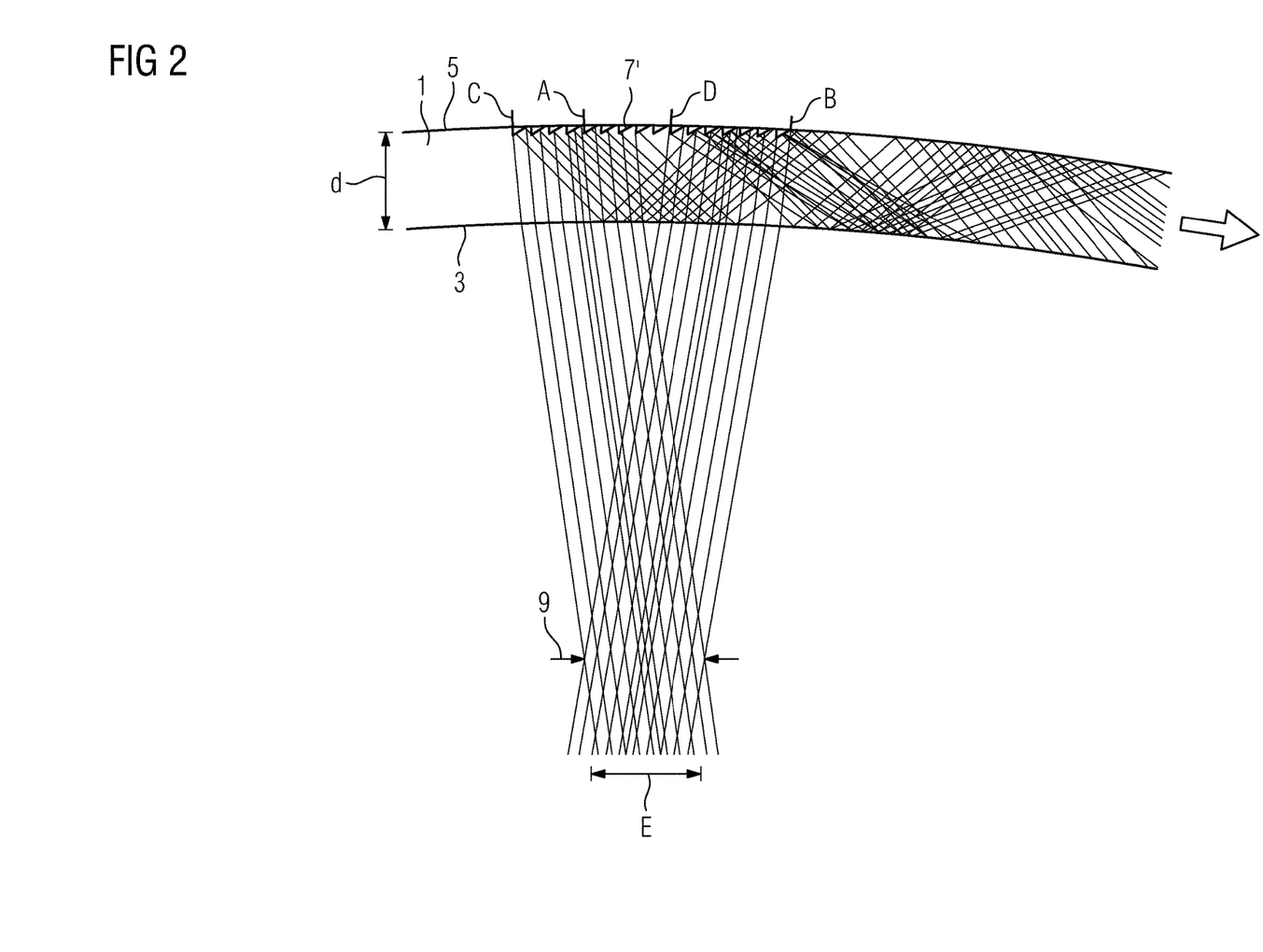
FIG. 2 shows a section of the imaging beam path in smart glasses according to prior art with a large field-of-view angle.

If, as shown in FIG. 1, the field-of-view angle is relatively small, the beams of the light tube, after the first total reflection on the inner surface 3 of the eyeglass lens 1, impinge on an area of the outer surface 5 of the eyeglass lens 1 which lies outside of the decoupling element 7 (in FIG. 1 on the right next to point B). However, if a large field-of-view angle is desired, as is shown in FIG. 2, a correspondingly enlarged decoupling structure 7' is required. However, this causes beams of the light tube, which impinge on the section of the decoupling structure 7' located between points A and C, to be reflected back after the first total reflection on the inner surface 3 of the eyeglass lens 1 to an area of the outer surface 5 of the eyeglass lens 1, in which the decoupling structure 7' is still located. This area, hereinafter called overlap area, is located in FIG. 2 between points B and D. Due to the presence of the decoupling element, which can be a diffractive or reflective decoupling element in the depiction selected in FIG. 2, the beams reflected from the inner surface 3 of the eyeglass lens 1 to the area between B and D are not reflected back in the direction of the inner surface 3, and so they are lost for imaging.

A similar problem also arises if the diameter of the eye box is enlarged instead of the field-of-view angle. In this case, there would also be points A and C, between which an area is located that reflects beams in the direction of the inner surface 3 of the eyeglass lens 1, which, under total reflection, are reflected back to an area of the decoupling structure 7' denoted by points B and D and are thus useless for imaging. The same would also apply if the eye-box diameter E and the field-of-view angle were maintained and the thickness d of the eyeglass lens were decreased. In other words, a sufficiently large eye-box diameter E at a sufficiently large field-of-view angle can only be achieved with a specific minimum thickness d of the eyeglass lens.

At this point, it must be noted once again that for the above description, the beam path was reversed, and that the actual beam path extends from the image generator to the exit pupil of the smart glasses. However, this changes nothing on the basic observation, since beams coming from the image generator, which impinge on the decoupling structure 7' in the area between points B and D, are not reflected into the exit pupil because they are not reflected back by means of total reflection in the direction of the inner surface of the eyeglass lens, which, however, would be necessary in order to reach the area of the decoupling structure 7' between points A and C, from where it would be possible to decouple them in the direction of the exit pupil.

SUMMARY

In light of the described prior art, a first problem addressed by the present invention is that of providing an imaging optical unit, with which the described problem of "footprint overlap" can be reduced. In addition, a second problem addressed by the present invention is that of providing advantageous smart glasses. The first problem is solved by an imaging optical unit according to claim 1, the second problem is solved by smart glasses according to claim 14. The dependent claims contain advantageous embodiments of the invention.

The invention provides an imaging optical unit for depicting a virtual image which can be used particularly in smart glasses. The imaging optical unit in certain embodiments comprises:

At least one eyeglass lens to be worn in front of the eye, which has an inner surface to be facing the eye, and an outer surface to be facing away from the eye. In the imaging optical unit according to the invention, the eyeglass lens can be an eyeglass lens correcting defective vision, or an optical zero element which does not correct defective vision. The latter can be particularly the case if the imaging optical unit is to be used in smart glasses that are designed as sunglasses or safety glasses. Furthermore, the eyeglass lens can be made of plastic or glass. The eyeglass lens can have a multilayer structure.

A display device, which comprises an image generator (display) for displaying an initial image, wherein the image generator is the starting point of an imaging beam path that produces the virtual image from the initial image. The display device can consist only of the image generator, or it can comprise further elements, e.g. lenses, mirrors, prisms, etc., and/or a means for adjusting the image generator. All types of displays, particularly liquid crystal displays (LCDs), displays based on light-emitting diodes (LED displays), and displays based on organic light-emitting diodes (OLED displays) are possible as image generator.

A coupling device for coupling the imaging beam path between the inner surface and the outer surface of the eyeglass lens. The coupling device can, e.g. be part of the eyeglass lens or part of the display device.

A decoupling structure present in the eyeglass lens for decoupling the imaging beam path from the eyeglass lens in the direction of the eye. The coupling device couples the imaging beam path such that between the inner surface and the outer surface of the eyeglass lens it is guided by means of reflections between the inner surface and the outer surface of the eyeglass lens to the decoupling structure. The reflections can be realized through a total reflection on the boundary between the medium/media of the eyeglass lens and the surrounding medium—usually air—or through reflection on a reflecting or partially reflecting coating which is applied to the inner surface and/or the outer surface of the eyeglass lens. This allows for the possibility of either all reflections being effected by total reflections or all reflections being effected by reflection on a reflecting or partially reflecting coating. However, it is also possible that one or more reflections are effected by reflection on a reflecting or partially reflecting coating, and the remaining reflections are effected by total reflection. The inner surface and/or outer surface does not necessarily have to be a boundary between the medium/media of the eyeglass lens and the surrounding medium. Instead, in case of a multilayer structure of the eyeglass lens, the inner surface and/or outer surface can be arranged between two layers or partial bodies of the eyeglass lens in the interior of the eyeglass lens. For example, the inner surface can be formed by a partially reflecting layer between a first partial body of the eyeglass lens which faces the eye and a second partial body of the eyeglass lens which faces away from the eye. The same can be applicable to the outer surface.

In the imaging optical unit, the decoupling structure is composed, along a separating line, of two partial structures, which are arranged at an angle $\beta$ to each other and which decouple beam paths that arrive from different directions in the direction of the eye, wherein the different directions of the arriving beam paths are determined by the angle $\beta$ between the partial structures. Hereby, it is particularly possible that the separating line divides the decoupling structure in two partial structures of equal size. Furthermore, one of the beam paths coming from different directions can form an angle $\beta/2$ with the separating line, and the other one of the beam paths coming from different directions can form an angle $-\beta/2$ with the separating line, thus making it possible to achieve symmetry to the separating line.

In the imaging optical unit according to certain embodiments of the invention, a beam-splitting structure is additionally present between the display device and the area of the eyeglass lens, in which the first reflection takes place; said beam-splitting structure splits the imaging beam path extending from the image generator into two partial imaging beam paths, which form the beam paths arriving from different directions at the partial structures of the decoupling structure. The beam-splitting structure can be arranged particularly between the image generator and the edge of the eyeglass lens.

In the imaging optical unit according to certain embodiments of the invention, the coupling device can be arranged particularly on a side edge of the eyeglass lens. As a result, the decoupling structure can have a width which extends along a width expansion direction, and a height which extends perpendicularly to the width expansion direction along a height expansion direction, wherein the width extension direction substantially runs in transverse direction of the eyeglass lens. In such case, the separating line can run between the partial structures parallel to the width expansion direction. Such a design is particularly compatible with the geometry of typical eyeglass lenses. Furthermore, in smart glasses provided with the imaging optical unit, this design allows for the placement of the display device in the eyeglass temple or between the eyeglass temple and the eyeglass lens, and so the display device can be integrated relatively inconspicuously in the smart glasses.

With the imaging optical unit according to certain embodiments of the invention, the initially described problem of the "footprint overlap" can be significantly reduced. Since the decoupling structure consists of two partial structures which are arranged at an angle β to one another and which decouple the beam paths arriving from different directions in the direction of the eye, those areas in the eyeglass lens, in which the reflection must occur and which in the prior art are located between points B and D of the decoupling structure, can be moved outside of the decoupling structure. For example, if the separating line runs in the width extension direction of the decoupling structure, the reflection, due to the angle between the partial structures, can be moved to areas of the eyeglass lens that are located above and below the decoupling structure.

Since the decoupling structure is arranged relatively close to the exit pupil of the imaging optical unit, it can be assumed that for the most preimage points, imaging takes place simultaneously via both imaging beam paths, which means that beams originating from one and the same preimage point are divided into partial beams, which run along the two imaging beam paths. However, they must arrive again at a common pixel, which can be realized by the alignment of deflectors of the beam-splitting structure. In addition, the same focal length must be present in both partial imaging beam paths, which can be realized with a suitable design of the imaging optical unit. The beam-splitting structure of the imaging optical unit according to the invention is thus preferably designed such that it comprises at least one deflector for each partial imaging beam path, and that the deflector deflects the appropriate imaging beam path in the direction of the corresponding partial structure of the decoupling structure into the eyeglass lens, wherein the deflectors for the two partial imaging beam paths are aligned such that beams of the imaging beam paths originating from the same preimage point of the image generator are brought together again on the same pixel in the virtual image. Furthermore, the imaging optical unit then has the same focal length for both partial imaging beam paths. The deflectors can particularly be reflective deflectors or refractive deflectors. Mirrors, prisms, or other reflection surfaces can be used as reflective deflectors, prisms, for example, can be used as refractive deflectors.

The imaging optical unit can be integrated at least to some extent in the coupling device and, for example, be realized such that the coupling device is provided with appropriate freeform surfaces. In addition, or alternatively, the imaging optical unit can be integrated at least to some extent in the decoupling structure, which in turn can have corresponding freeform surfaces. And further additionally or alternatively, the imaging optical unit can be integrated at least to some extent in the beam splitter, wherein the reflecting or refracting surfaces are then designed as suitable freeform surfaces. Further additionally or alternatively, the imaging optical unit can be integrated at least to some extent in the display device. In such case, the imaging optical unit can have suitable lens or playing surfaces. It is particularly possible that at least two of the elements coupling device, decoupling structure, beam splitter, and display device each contain a part of the imaging optical unit and jointly provide for the generation of the virtual image.

The decoupling structure can particularly be a reflective strip structure with reflective strips. In such case, the strip structure is arranged on the outer surface of the eyeglass lens and can consist of mirrored strips or partially mirrored strips. Particularly in the case of mirrored strips, reflective and non-reflective strips can be arranged alternatingly. The virtual image is then superimposed over the surrounding image such that reflected light beams spatially alternatingly with the light beams transmitted from the eyeglass lens from the surroundings impinge on the pupil, and so a geometric beam overlap is present in the pupil. In the case of partially mirrored strips, the respective strips can be arranged directly adjacent to one another. A portion of the ambient light can in such case pass the partially mirrored strips in the direction of the exit pupil. Light beams originating from the image generator are simultaneously reflected by the partially mirrored strips in the direction of the exit pupil, and so a physical beam overlap occurs.

Alternatively, to the design of the decoupling structure as reflective strip structure, the strip structure can also be designed as refractive strip structure. Such a strip structure is then arranged on the inner surface of the eyeglass lens and refracts the beams from the image generator such that they are deflected into the exit pupil of the eyeglass lens.

A further alternative for the design of the decoupling structure is that of designing the strip structure as diffractive strip structure. In such case, decoupling is effected in the direction of the eye box not by reflection but by diffraction. The partial structures are aligned such that their dispersion directions are at an angle of β to each other. However, as a rule, a polychromatic decoupling is complicated with a diffractive strip, and so the reflective or refractive strip structures are preferred.

Regardless of the design of the strip structure, the respective strip surfaces can be overlapped by freeform surfaces if the decoupling structure is supposed to be part of the imaging optical unit In the imaging optical unit, the angle β between the two partial structures is selected such that the parameter $e=(E \times \alpha)/d$ assumes a value of at least 0.4, preferably of at least 0.5, wherein E denotes the diameter of the exit pupil located on the entrance pupil of the eye in mm, α denotes the field-of-view angle, particularly the horizontal field-of-view angle, in radian, and d denotes the thickness of the eyeglass lens in mm. The parameter e is a measurement for the possible light throughput through the light tube of the imaging optical unit. With decoupling structures according to prior art, a maximum value for the parameter e of approximately 0.25 is possible. Due to the division of the decoupling structure into two partial structures, which are arranged to one another at an angle β, the value for the parameter can be increased at least to 0.4, particularly at least to 0.5. This, for example, makes it possible to decrease the thickness of the eyeglass lens, and so imaging optical units with at least one field-of-view angle and one eye box, as they have been realized in prior art, can be realized with a thickness of the eyeglass lens which is reduced when compared to the prior art, for example with an eyeglass lens with a thickness of no more than 3 mm and particularly of no more than 2.5 mm thickness. By contrast, the imaging optical units for smart glasses according to prior art have typical glass thicknesses of 4 mm or more. However, it is also possible to leave the glass thickness unchanged when compared to the prior art and instead increase the field-of-view angle to at least 12.5°, particularly to at least 15°, and further particularly to at least 20°. By contrast, the field-of-view angle of imaging optical units for smart glasses according to prior art is currently approximately 10°. In comparison to the prior art, it is additionally also possible to both decrease the thickness of the eyeglass lens and to increase the field-of-view angle. The invention thus allows, e.g. when compared to the prior art, to realize a field-of-view angle of 12.5°, which is an increase when compared to the prior art, at an exit pupil diameter of 6 mm and glass thickness of 2.5 mm, which is a decrease when compared to the prior art.

Smart glasses according to certain embodiments of the invention have an imaging optical unit according to the invention for generating a virtual image. The advantages to be gained with smart glasses according to the invention follow immediately from the advantages described with reference to the imaging optical unit according to the invention.

Further features, properties, and advantages of the present invention follow from the following description of embodiments with reference to the attached drawings.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the following, an example embodiment of smart glasses with an imaging optical unit according to the invention shall be described in further detail with reference to the attached drawings. FIG. 1 shows a schematic view of the smart glasses, and FIG. 3 shows the profile of partial imaging beam paths in the eyeglass lens of the imaging optical unit.

Figure 3:
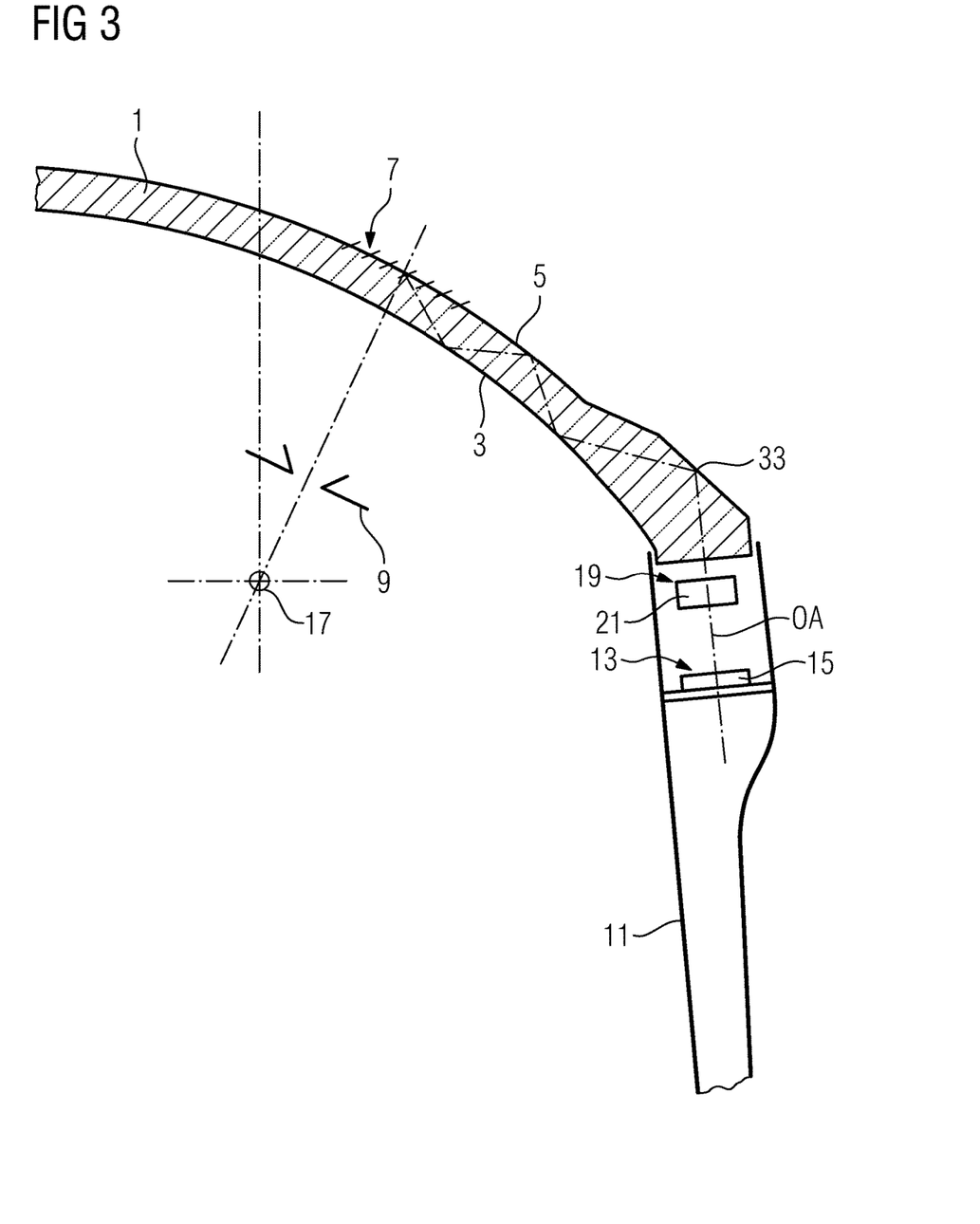
FIG. 3 shows a schematic view of the basic structure of smart glasses with an imaging optical unit according to the invention.
Figure 4:
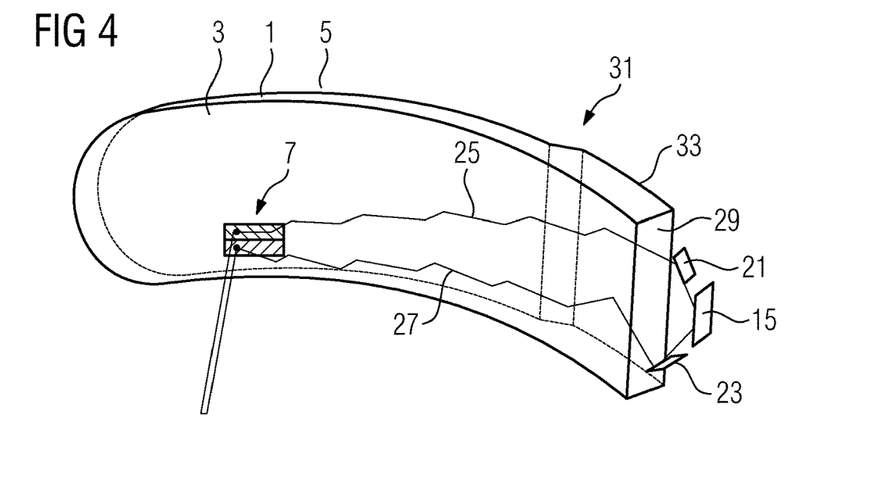
FIG. 4 shows a perspective view of the profile of partial imaging beam paths in the imaging optical unit from FIG. 3.

The smart glasses of the embodiment shown in FIG. 3 comprise an imaging optical unit with at least one eyeglass lens 1, having an inner surface 3 facing the eye of the user when the smart glasses are worn, and an outer surface 5 facing away from the eye of the user when the smart glasses are worn. The smart glasses further comprise a temple 11, in which a display device 13 with an image generator 15 is integrated in the present embodiment. Deviating from the embodiment shown, the display device 13, which is part of the imaging optical unit, can also be integrated in a component arranged between the temple 11 and the eyeglass lens 1.

The imaging optical unit creates an image from an initial image generated by the image generator 15. The appropriate imaging beam path leads from the image generator 15 into an exit pupil 9 of the imaging optical unit which, when the smart glasses are worn, is located at the location of the pupil of the user eye, of which FIG. 3 only shows the eye's center of rotation 17. By means of a beam-splitting structure 19 of the imaging optical unit, which in the present embodiment is depicted as a first mirror 21 and a second mirror 23, the imaging beam path is divided into two partial imaging beam paths 25, 27. While the first mirror 21 generates the first partial imaging beam path 25 and couples it on the upper end of a coupling surface 29 in a coupling section 31 of the eyeglass lens 1, the second mirror 23 generates the second partial imaging beam path 27 and couples it at the lower end of the coupling surface 29 in the coupling section 31 of the eyeglass lens 1. From a reflection surface 33, which is formed on the outer surface 5 of the eyeglass lens 1 in the coupling section 31, the coupled partial imaging beam paths 25, 27 are reflected between the outer surface 5 and the inner surface 3 of the eyeglass lens 1 such that, when impinging on the inner surface 3, they are subjected to a total reflection, by means of which they impinge on the outer surface 5 at an angle which results in a further total reflection. Due to a series of total reflections on the inner and outer surface of the eyeglass lens 1, the partial imaging beam paths 25, 27 are guided to a decoupling structure 7 of the imaging optical unit, from where they are decoupled from the eyeglass lens 1 in the direction of the exit pupil 9 of the imaging optical unit.

Figure 5:
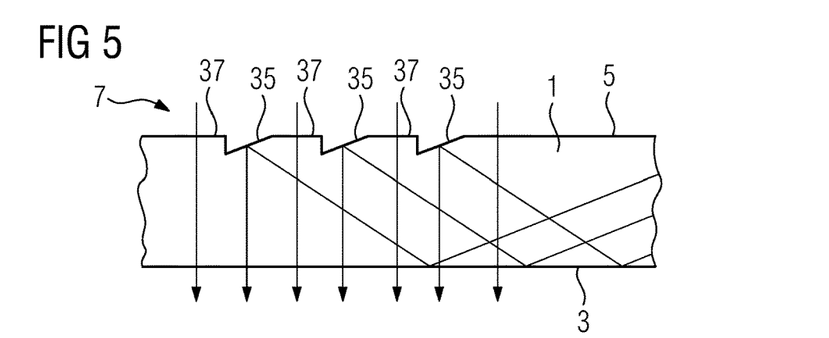
FIG. 5 shows a cutaway view of a reflective decoupling structure as it can be used in the imaging optical unit from FIG. 3.
Figure 6:
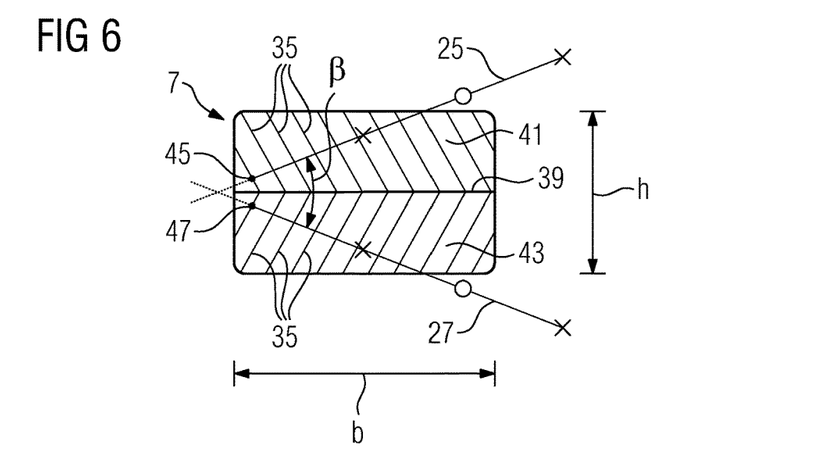
FIG. 6 shows a top view of the decoupling structure of the FIG. 3.

FIGS. 5 and 6 show the decoupling structure 7 in detail. For the decoupling of the partial imaging beam paths 25, 27 from the eyeglass lens 1, it has facets 35, which extend along a linear extension direction, and which are arranged in the outer surface 5 of the eyeglass lens 1. The facets 35 form fully or partially mirrored surfaces, which are facing the inside of the eyeglass lens 1, and which deflect the totally reflected beams coming from the inner surface 3 of the eyeglass lens 1 such that they emerge from the eyeglass lens 1. The facets 35 are arranged relative to the outer surface 5 of the eyeglass lens 1 at such an angle that the decoupled beams run through an exit pupil 9 of the imaging optical unit, which is located at the location of the pupil of the user eye, when the smart glasses are worn. Between the individual facets 35, intermediate sections 37 are located, the surfaces of which correspond to the initial outer surface 5 of the eyeglass lens 1. Beams that emanate from the surroundings pass through the intermediate sections 37 through the eyeglass lens 1 into the exit pupil 9 of the imaging optical unit. This way, a geometric overlap of beams from the surroundings and beams originating from the image generator 15 is present in the exit pupil 9 of the imaging optical unit. The virtual image generated by the imaging optical unit thus appears to the user as if it were floating in the surroundings.

FIG. 6 shows a top view of the decoupling structure 7 from the direction of the exit pupil 9 of the imaging optical unit. FIG. 6 particularly shows that the decoupling structure 7 has a strip structure, wherein the strip structure is divided into two partial structures 41, 43 along a separating line 39, which in the present embodiment runs parallel to the direction of the width expansion direction of the decoupling structure. The partial structures 41, 43 are arranged at an angle β to each other, wherein β represents the angle between two straight lines running perpendicularly to the expansion direction of the facets 35, with each of these straight lines forming an angle β/2 (with different algebraic signs) with the separating line 39. The straight lines mainly also correspond to a projection of beams of the partial imaging beam paths 25, 27 onto the partial structures 41, 43 of the decoupling structure 7. In FIG. 6, the partial imaging beam paths are represented by two beams arranged to each other at the angle 3. In addition, points, at which a total reflection of the beams takes place on the inner surface 3 of the eyeglass lens 1, are marked with an X, and points, at which a total reflection of the beams takes place on the outer surface 5 of the eyeglass lens 1 (in which the decoupling structure 7 is also formed) are marked with a circle. At the decoupling points 45, 47 marked in FIG. 6, the beams 25, 27 depicted in the drawing are decoupled from the eyeglass lens 1 in the direction of the exit pupil 9 of the imaging optical unit.

Figure 7:
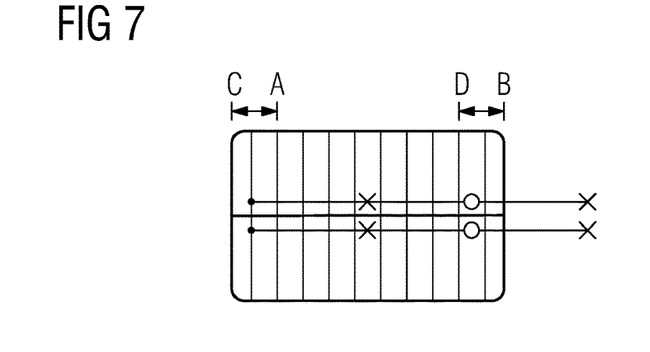
FIG. 7 shows a top view of a decoupling structure according to prior art.

As can be seen in FIG. 6, a total reflection of the beams 25, 27 takes place on the outer surface 5 of the eyeglass lens 1 above and below the decoupling structure 7 in the direction of the inner surface 3 of the eyeglass lens 1, from where the beams 25, 27 are once again reflected by means of a total reflection to their decoupling points 45, 47. These decoupling points 45, 47 are located on the outer left edge of the decoupling structure 7. In case of decoupling points that are located further away from the left edge of the decoupling structure 7, i.e. closer to the right edge of the decoupling structure 7 than the decoupling points 45, 47 depicted in FIG. 6, the points of a total reflection on the outer surface 5 of the eyeglass lens 1, marked with a circle, move further away from the decoupling structure 7. The same applies if the decoupling points 45, 47, located in FIG. 6 in close proximity to the separating line 39, are further away from the separating line 39. It is thus possible that the entire surface of the decoupling structure 7 is reached by beams, the last total reflection of which lies on the outer surface 5 of the eyeglass lens 1 outside the decoupling structure 7. For comparison, FIG. 7 shows the situation with a decoupling structure according to prior art, i.e. with a decoupling structure which is not designed as two partial structures arranged to each other at an angle. As FIG. 7 readily shows, with a decoupling structure according to prior art, the last point at which a total reflection would take place on the outer surface 5 of the eyeglass lens 1, would be located within the decoupling structure, and so a useful total reflection does no longer occur. This results in a situation as was described with reference to FIG. 2. Due to the dividing of the decoupling structure into two partial structures and the arrangement of the partial structures at an angle β to each other, it is thus possible to achieve that the last reflection point for a total reflection at the outer surface 5 of the eyeglass lens 1 is moved to an area of the outer surface 5, in which the decoupling structure 7 is not located. As a result, the usable surface of the decoupling structure can be increased when compared to the prior art. While in the prior art, only the surface between A and D is usable for a meaningful decoupling, with the decoupling structure according to the invention, it is possible to use the entire surface for a meaningful decoupling.

The decoupling structure 7 lies relatively close to the exit pupil 9 of the imaging optical unit. Since all imaging beams of the imaging beam path pass through the entire diameter of the exit pupil 9, it can be assumed, due to the arrangement of the decoupling structure 7 close to the pupil, that the decoupling structure 7 reflects the imaging beams with a large portion of its surface into the exit pupil 9. The beam-splitting structure 19 is therefore designed such that it splits the beams originating from the preimage points to the image generator 15 such that a beam originating from a preimage is guided via both partial image beams 25, 27 to the decoupling structure 7. The hereto required precise arrangement and alignment of the reflecting and/or refracting elements in the beam-splitting structure 19 depends on the properties of the eyeglass lens 1 and the angle β between the partial structures 41, 43 of the decoupling structure 7. Parameters of the eyeglass lens 1, which are included in the arrangement and alignment of the reflecting and/or refracting elements in the beam-splitting structure 19, are particularly the thickness of the eyeglass lens 1, the refractive index of the material, of which the eyeglass lens 1 is made, the curvature of the inner surface 3 of the eyeglass lens 1, and the curvature of the outer surface 5 of the eyeglass lens 1. In addition, it must be ensured that both partial imaging beam paths have the same focal length. This can be realized with a suitable design of the surfaces of the imaging optical unit that are involved in the image forming. In the present embodiment, the surfaces involved in image forming are distributed between the decoupling structure 7 and the beam-splitting structure 19. The necessary focusing and/or defocusing properties of the decoupling structure 7 and the beam-splitting structure 19 are achieved as a result of each of the reflecting surfaces of the facets 35 and the reflecting surfaces and/or the refracting surfaces of the beam-splitting structure 19 having freeforms that are suitable for effecting the appropriate focusing or defocusing. A person skilled in the art can determine suitable surface forms on the basis of the properties of the eyeglass lens 1 and the desired imaging properties by means of an optics design software.

Due to the separated light guidance of the partial imaging beam paths 25, 27 to the partial structures 41, 43 of the decoupling structure 7, the constant e, which is given as the ratio of product of exit pupil diameter E and field-of-view angle α to glass thickness d, can be at least doubled, when compared to the prior art. The constant e is hereby a measurement for the possible light throughput from the image generator into the exit pupil of the imaging optical unit. The field-of-view angle α is the field-of-view angle in the direction of the separating line 39 which, in an imaging optical unit according to the invention, runs such that the separating line 39 extends essentially horizontally, when the smart glasses are worn. Due to the increase of the constant e, it is possible, for example, to increase the field-of-view angle of 10°, as is currently usual in the prior art, to 20° at a diameter of the exit pupil of 6 mm and a glass thickness of 4 mm. However, it is also possible to increase the field-of-view angle α only to 12.5° and to reduce the glass thickness at an exit pupil meter of 6 mm to 2.5 mm. In both cases, the constant e is approximately 0.52, when compared to the prior art, in which the field-of-view angle is typically 10°, the exit pupil meter is typically 6 mm and the glass thickness is typically 4 mm, and the constant e has a value of 0.26.

Figure 8:
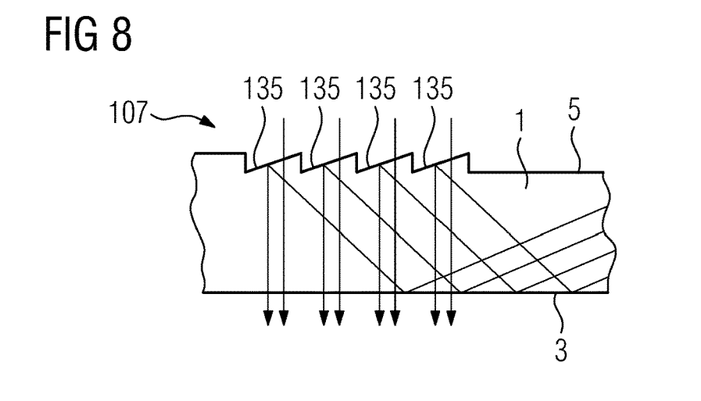
FIG. 8 shows a cutaway view of an alternative reflective decoupling structure as it can be used in the imaging optical unit from FIG. 3.

In the embodiment described with reference to FIGS. 3 to 7, the facets 35 of the decoupling structure 7 can be fully mirrored, and facet-free areas 37 are present between the facets 35. An alternative embodiment of the decoupling structure is shown in FIG. 8. In this embodiment, the decoupling structure 107 has partially mirrored facets 135. From the inner surface 3 of the eyeglass lens 1 in the direction of the facets 135, totally reflected beams are reflected from the facets 135 into the exit pupil 9. Beams originating from the surroundings can pass the partially mirrored facets in the direction of the exit pupil, and so in the area of the exit pupil 9, a physical overlap of the beams of the imaging beam path with beams from the surroundings takes place, and so the user of smart glasses provided with the imaging optical unit has the impression that the virtual image is floating in the surroundings. The decoupling structure 7 in the embodiment described with reference to FIGS. 3 to 7 can readily be replaced by the decoupling structure 107 described with reference to FIG. 8.

Figure 9:
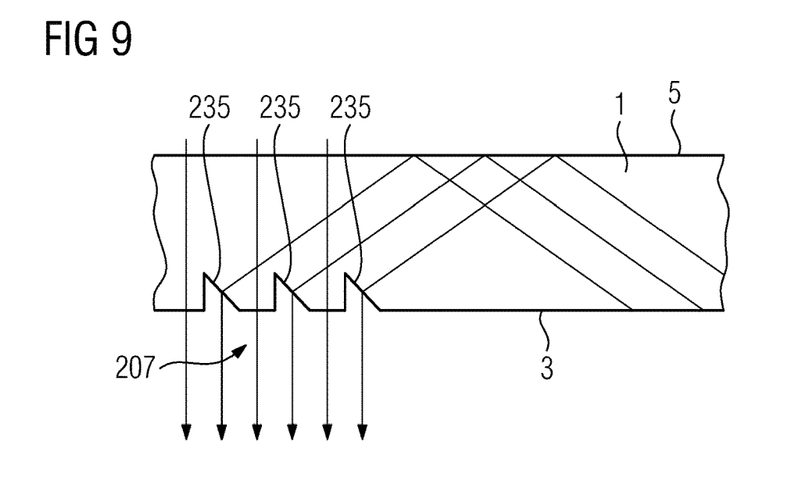
FIG. 9 shows a cutaway view of a refractive decoupling structure as it can be used in the imaging optical unit from FIG. 3.

A further alternative embodiment of the decoupling structure is shown in FIG. 9. The decoupling structure 207 shown in FIG. 9 is not based on a reflection of the beams to be decoupled in the direction of the exit pupil 9, but on a refraction of the beams to be decoupled in the direction of the exit pupil 9. In the decoupling structure 7 shown in FIG. 9, facets are for that purpose arranged on the inner surface 3 of the eyeglass lens 1, onto which the beams of the partial imaging beam paths, which were for the last time totally reflected by the outer surface 5 of the eyeglass lens 1, impinge. When crossing into the optically thinner medium air (or another optically thinner medium), they are then refracted away by the surface normal of the facets 235 in the direction of the exit pupil 9. If a decoupling structure 207, as shown in FIG. 9, in an embodiment described with reference to FIGS. 3 to 7, is to be used, the decoupling structure must be moved from the outer surface 5 of the eyeglass lens 1 to the inner surface 3 of the eyeglass lens. In addition, the imaging beam path must be modified such that the very last total reflection prior to the decoupling of the partial imaging beam paths takes place not on the inner surface 3 of the eyeglass lens 1, but on its outer surface 5.

Similar to the decoupling structure 7 shown in FIG. 5, the reflecting or refracting surfaces of the facets can also be overlapped with freeform surfaces in the decoupling structures 107, 207 shown in FIGS. 8 and 9, and so they can serve as part of the imaging optical unit.

The present invention is particularly suitable for virtual images in landscape format and the greater the ratio of width to height in the image format, the smaller an angle between the partial structures of the decoupling structure is required. The invention is thus particularly suitable for images in landscape format, particularly for images in landscape format with an aspect ratio of 16:9. In case of a portrait format, the partial imaging beam paths can be coupled, e.g. on the upper side or the underside of the eyeglass lens between the inner surface and the outer surface, wherein the separating line between the partial structures of the decoupling structure then runs parallel to the height expansion direction. However, the coupling of the partial imaging beam paths between the inner surface and the outer surface of the eyeglass lens from the side, and the course of the separating line parallel to the width expansion direction of the decoupling structure can also be maintained for a portrait format, provided that the required angle β between the partial structures of the decoupling structure does not widen to the extent that one of the partial imaging beam paths passes the upper side or the underside of the eyeglass lens.

In the present embodiment, the reflections between the inner surface and the outer surface of the eyeglass lens, with which the imaging beam path is guided to the decoupling structure, are realized through total reflection on the boundaries between the medium of the eyeglass lens and the surrounding air. Alternatively, all or some of the reflections can also be realized by means of reflective or partially reflective coatings which are applied to the eyeglass lens or embedded into the eyeglass lens.

For illustration purposes, the present invention was described in detail by means of an embodiment and its variations. However, a person skilled in the art understands that further variations, which are not explicitly described in the embodiments, are possible. For example, instead of being arranged in a part of the eyeglass lens, the reflection surface 33 can be arranged in a separate prism which is arranged between the eyeglass lens and the image generator. As a result, the beam-splitting structure can be arranged either between the image generator and the prism or between the prism and the eyeglass lens. Furthermore, the decoupling structure does not necessarily have to be divided into two partial structures of equal size, and the partial imaging beam paths do not have to extend at the same angle (with different algebraic signs) to the separating line. In particular, the arrangement of the decoupling structure in the eyeglass lens can make it necessary that the partial imaging beam paths have different angles to the separating line in order to ensure that they do not pass the upper or lower edge of the eyeglass lens, which in turn can make it necessary that the partial structures of the decoupling structure have different measurements in a direction perpendicular to the separating line. Therefore, the present invention is not supposed to be delimited by combinations of features of the described embodiment and its variations, but merely by the dependent claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An imaging optical unit for generating a virtual image to an eye, comprising:
   at least one eyeglass lens to be worn in front of the eye, the eyeglass lens including an inner surface facing the eye and an outer surface facing away from the eye;
   a display device comprising an image generator configured to display an initial image, wherein the image generator defines a starting point of an imaging beam path that produces the virtual image from the initial image;
   a coupling device configured to couple the imaging beam path between the inner surface and the outer surface of the eyeglass lens; and a decoupling structure present in the eyeglass lens and configured to decouple the imaging beam path from the eyeglass lens in the direction of the eye, wherein the coupling device couples the imaging beam path between the inner surface and the outer surface of the eyeglass lens such that the imaging beam path is guided to the decoupling structure via reflections between the inner surface and the outer surface, wherein the decoupling structure is composed, along a separating line, of two partial structures which extend at an angle β to each other, and which decouple beam paths arriving from different directions in the direction of the eye, wherein different directions of the arriving beam paths are determined by the angle β between the partial structures, and wherein a beam-splitting structure is disposed between the display device and an area of the eyeglass lens, in which the first reflection occurs, said beam-splitting structure splitting the imaging beam path extending from the image generator into two partial imaging beam paths, which form the beam paths arriving from different directions on the partial structures of the decoupling structure.

2. The imaging optical unit according to claim 1, wherein one of the beams coming from different directions forms an angle β/2 with the separating line, while the other one of the beams coming from different directions forms an angle −β/2 with the separating line.

3. The imaging optical unit according to claim 1, wherein the coupling device is arranged on a side edge of the eyeglass lens, the decoupling structure has a width which extends along a width expansion direction, and a height which extends along a height expansion direction perpendicularly to the width expansion direction, wherein the width expansion direction runs in lateral direction of the eyeglass lens, and the separating line runs between the partial structures parallel to the width expansion direction.

4. The imaging optical unit according to claim 1, wherein the separating line divides the decoupling structure into two partial structures of equal size.

5. The imaging optical unit according to claim 1, wherein, for each partial imaging beam path, the beam-splitting structure comprises at least one deflector which deflects the appropriate partial imaging beam path in the direction of the corresponding partial structure of the decoupling structure into the eyeglass lens, and the deflectors for the two partial imaging beam paths are aligned such that beams of the partial imaging beam paths originating from a common preimage point of the image generator are brought together again in the same pixel in the virtual image, and the imaging optical unit has the same focal length for both partial imaging beam paths.

6. The imaging optical unit according to claim 5, wherein the beam-splitting structure comprises at least one of a reflective deflector and a refractive deflector.

7. The imaging optical unit according to claim 1, wherein at least one of the coupling device, the decoupling structure and the beam-splitting structure are formed such that, in addition to their primary functions, they also contribute to the image generation.

8. The imaging optical unit according to claim 1, wherein the decoupling structure comprises a reflective strip structure with reflective strips.

9. The imaging optical unit according to claim 1, wherein the decoupling structure comprises a refractive strip structure with refractive strips.

10. The imaging optical unit according to claim 1, wherein the decoupling structure comprises a diffractive strip structure with diffractive strips.

11. The imaging optical unit according to claim 1, wherein the angle β between the two partial structures is such that a parameter $e=(E \times \alpha)/d$ assumes a value of at least 0.4, wherein E denotes the diameter of an exit pupil located on the entrance pupil of the eye in mm, α denotes a field-of-view angle in radians, and d denotes a thickness dimension of the eyeglass lens in mm.

12. The imaging optical unit according to claim 11, wherein the eyeglass lens has a thickness dimension d of no more than 3 mm.

13. The imaging optical unit according to claim 11, wherein the field-of-view angle α is at least 12.5 degrees in a horizontal plane.

14. A smart glasses with an imaging optical unit for generating a virtual image according to claim 1.

* * * * *